March 16, 1954
J. E. ROOKUS
2,672,336
DUAL DIRECTIONAL FILM REEL
Filed Aug. 20, 1951
3 Sheets-Sheet 1
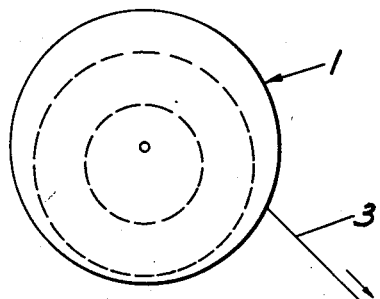
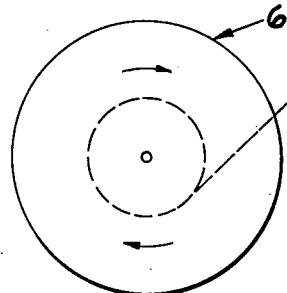
*Fig. 1*
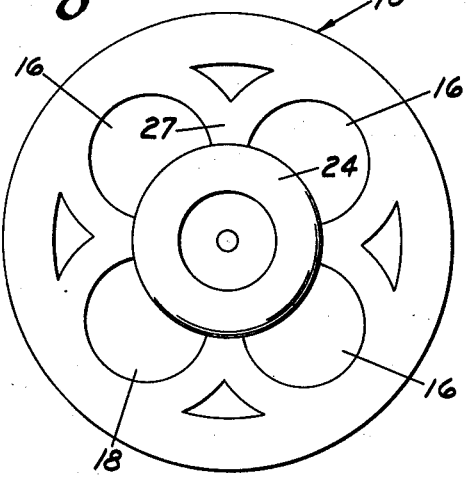
*Fig. 2*
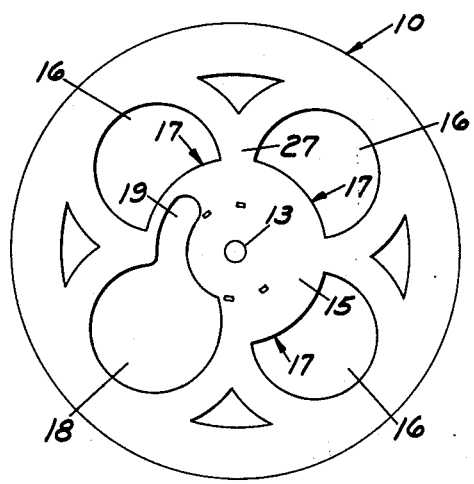
*Fig. 3*
INVENTOR.
JAMES E. ROOKUS
BY
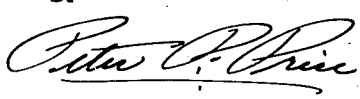

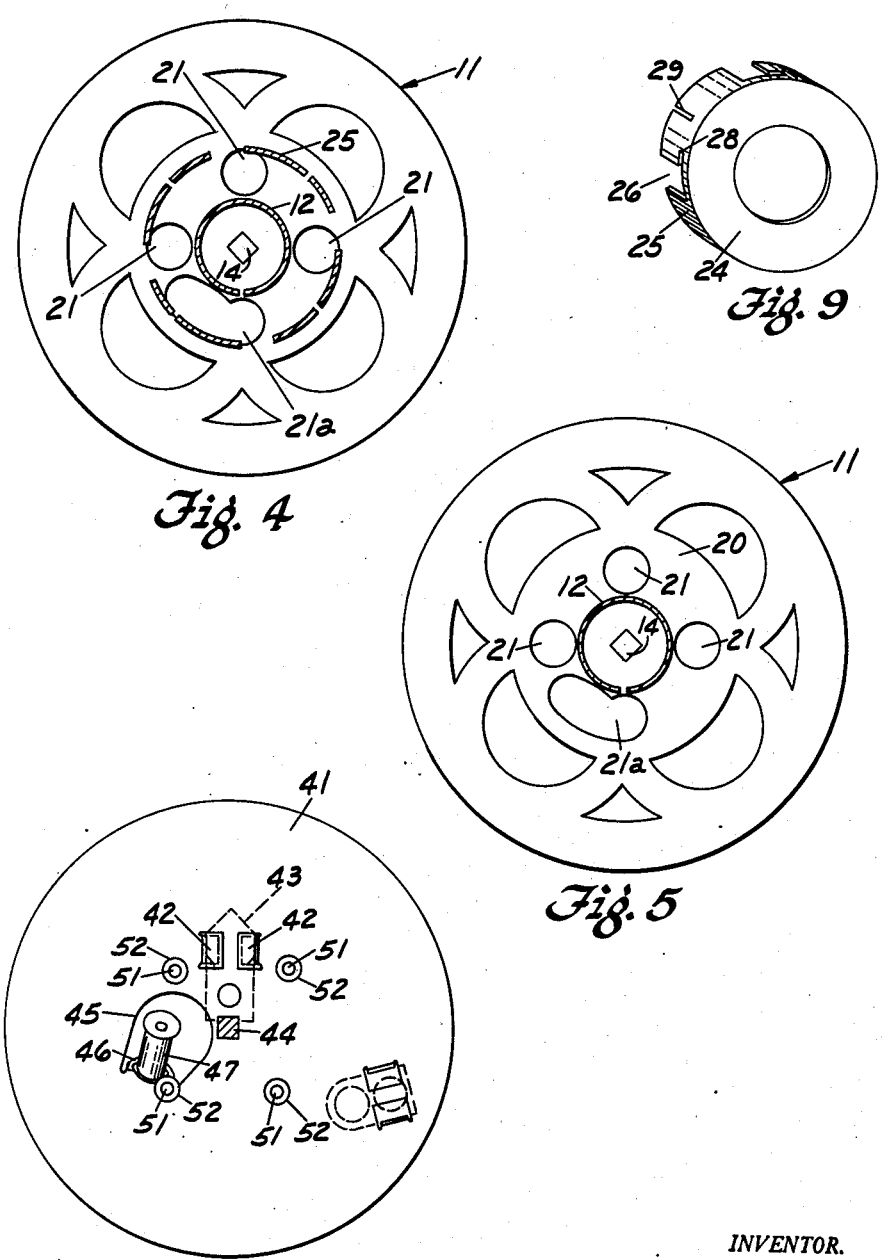

March 16, 1954
J. E. ROOKUS
2,672,336
DUAL DIRECTIONAL FILM REEL
Filed Aug. 20, 1951
3 Sheets-Sheet 3
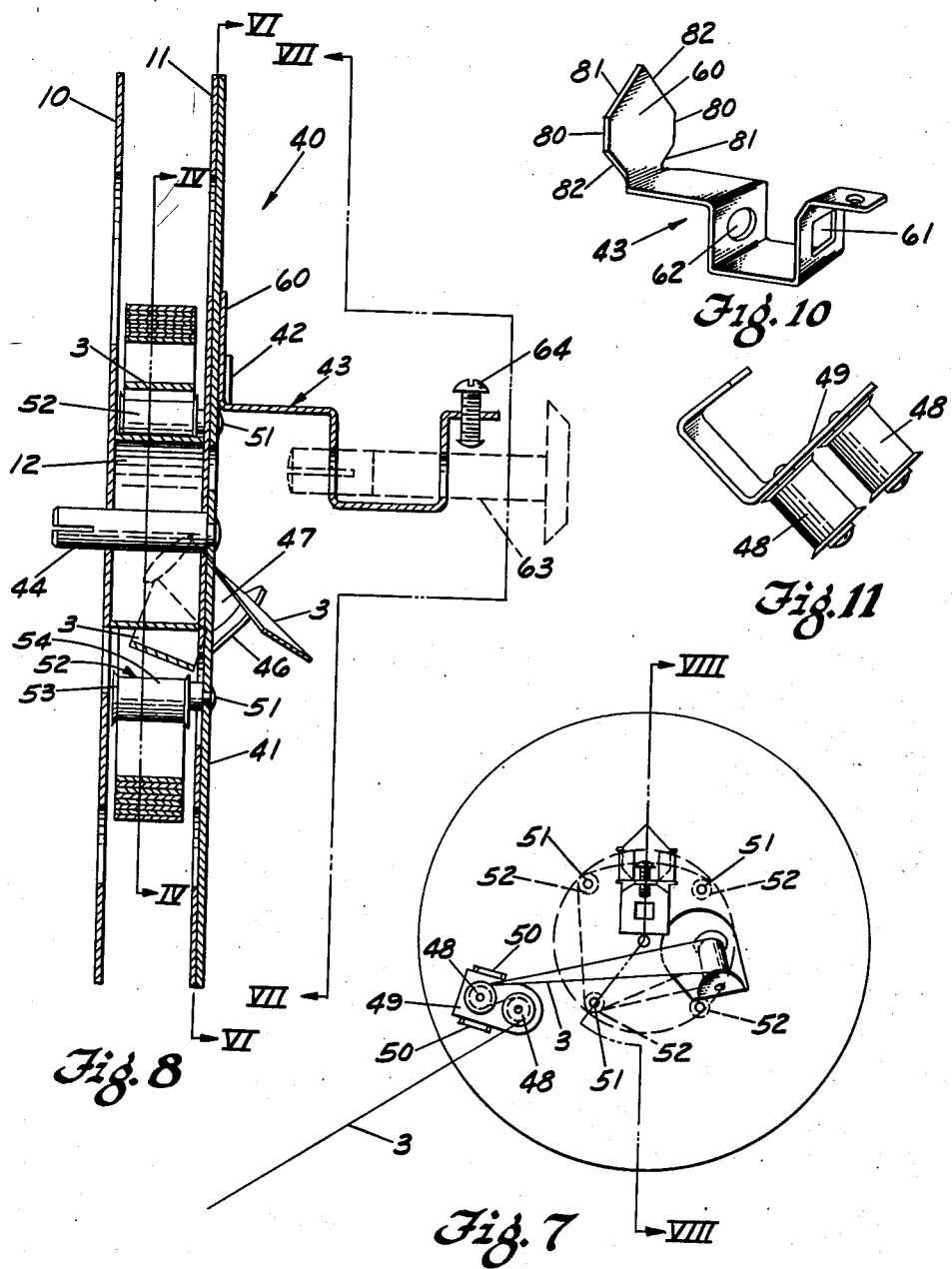
INVENTOR.
JAMES E. ROOKUS
BY

Patented Mar. 16, 1954

2,672,336

UNITED STATES PATENT OFFICE 2,672,336

DUAL DIRECTIONAL FILM REEL

James E. Rookus, Grand Rapids, Mich.

Application August 20, 1951, Serial No. 242,592

4 Claims. (Cl. 271—2.17)

This invention relates to motion-picture projection equipment and more particularly to the structure of the reels from which the film is withdrawn and upon which the film is wound during projection.

It is current practice to provide a projector with a pair of shafts, one of which is driven and causes the reel mounted thereon to roll up the film after it has passed the projecting lens. Another reel is mounted for free rotation on the other shaft and from this reel the strip of film is withdrawn by the projector mechanism as the film passes the projecting lens. The film on the supply reel is withdrawn from the outside of the coil of film wrapped thereon and is stored on the driven reel by coiling the film upon itself about the hub of the reel. This operation results in a reversal of the strip of film, end for end, whereby it is necessary to rewind the film before it can be projected again. This rewinding operation is carried out at a relatively high velocity, compared to the projection operation. The result is appreciable wear upon the film due to a double winding operation for each projection as well as the wear attendant the high velocities employed in the rewinding operation. This wear greatly increases the tendency of the film to break as well as materially increasing the time necessary between projections of the film.

This invention provides a mechanism operating upon the (inside unwinding) principle. During the projection operation the film is wound upon the reel in the conventional manner. However, the film is supplied to the projector by withdrawing it from the inside of the film reel whereby the film will be projected from its lead end and the fact that the film was reversed during the winding operation becomes unimportant. This not only eliminates the wear attendant the rewinding operation but it also eliminates the time necessary for rewinding and makes the film immediately available for reprojection.

The principle of inside unwinding is not new and many efforts have been made to develop a satisfactory mechanism for effecting it. However, considerable difficulty has been encountered in the withdrawal of the film from the inside of the storage spool due to binding, jamming and tearing of the film as it passes through the leading mechanism utilized to guide the film from the inside of the roll of film to a position where it can pass through the projector. In order to withdraw the film from within its coil, it has been conventional practice to provide an exit roller disposed on an axis at a considerable angle to the plane of the film coil. This roller is located within the initial opening of the coil and has given rise to most of the difficulties experienced. Attempts to overcome this difficulty have resulted in large complicated mechanisms both expensive to produce and not readily adaptable to existing projection equipment. One of the serious difficulties encountered has been the tendency of the film to pull tightly about the inner guiding studs resulting in high tension loads and breakage of the film. This has largely been due to the numerous, sharp changes in the direction of the film as the film is removed from the inside of the coil. It often occurs that the film will become snarled as it uncoils, resulting in damage to the film.

Existing mechanisms designed to effect inside unwinding frequently attempt to rotate the spool of film by rotation of its supporting structure rather than by withdrawing the film from the coil. This results in a complicated mechanism which not only is unsatisfactory but is not adapted to use upon existing equipment.

My invention provides a series of rollers for engaging the innermost coil of the film upon which the film rests. By the use of these rollers the film is free to rotate under the forces resulting from the withdrawal of the film from the inside of the coil. In this manner a minimum amount of pull upon the strip of film is required to overcome the inertia of the coil of film and the friction between the film and its supporting structure. Inasmuch as I mount my film vertically the film will normally rest upon only two free rollers. This further reduces the effort necessary to rotate the entire coil of film.

It is, therefore, a primary object of my invention to provide means which will smoothly uncoil a strip of film from the inside of a coil without damage or breakage to the film itself.

It is an additional object of my invention to provide such a mechanism in which the rotation of the coil of film as it is unwound is effected by the withdrawing of the film itself from the coil.

It is another object of my invention to provide a mechanism for removing film from the inside of the coil which leads the film along a path of such shape that the film may trace this path without excessive bending and without requiring excessive pull.

It is a further object of my invention to provide such a mechanism which is readily adaptable to existing projection equipment without modification of the equipment itself.

It is a further additional object of my invention to provide such a mechanism which is simple and will operate with reels of conventional size and design.

These and other objects and advantages of my invention will be immediately seen by those acquainted with the design and construction of photographic equipment upon reading the following specification and the accompanying drawings.

In the drawings:

Figure 1 is a diagrammatic presentation of the path through which the film travels as it passes through a projector.

Figure 2 is a side, elevation view of the outer disc of my film reel with the conversion cap in place.

Figure 3 is a side, elevation view of the outer disc of my film reel with the conversion cap removed.

Figure 4 is a sectional, elevation view taken along the plane IV—IV of Figure 8, with the conversion cap in place.

Figure 5 is a sectional view taken along the same plane as Figure 4 with the conversion cap removed.

Figure 6 is a sectional view taken along the plane VI—VI of Figure 8.

Figure 7 is a side, elevation view of my invention taken along the plane VII—VII of Figure 8.

Figure 8 is a sectional view of my invention taken along the plane VIII—FIII of Figure 7.

Figure 9 is an oblique view of the conversion cap for my invention.

Figure 10 is an oblique view of the mounting fitting for my invention.

Figure 11 is an oblique view of the film guide for my invention.

In executing the objects and purposes of my invention, I have provided a mounting support adapted to be affixed to the shaft of a conventional projector, upon which shaft is normally mounted the supply reel of film. This support is equipped with an inclined roller over which the film is guided from the inside of the film coil to a guide which aligns the film with the conventional equipment for carrying the film past the projection lens. On this support is mounted a non-rotatable reel having free rollers forming the film coil support and a special opening on each side. One opening is for the passage of the film to the inclined roller and the other for access to the film when threading it before projection is initiated. The reel is provided with a rectilinear central opening whereby it may be mounted upon the film winding shaft and be driven for coiling the film after projection when the reel is so used. A cap is provided for use when the film is being wound upon the reel to provide a firm support for the film as it is coiled. This cap is removed when the reel is placed in feeding position and the film is to be withdrawn from the center of the coil. This cap also adapts the reel to standard equipment when inside unwinding is not employed.

In the following description the terms "inwardly" and "outwardly" will be frequently used and are to be taken to mean "inwardly" toward the projector or to the right as the reel appears in Figure 8 and "outwardly" away therefrom, except where preceded by the word "radially." The terms "forwardly" and "rearwardly" are also freely used and are to be taken to mean "forwardly" and "rearwardly" toward the projection lens of the projector to the left of Figure 7 and "rearwardly" away therefrom.

In the drawings, the numeral 1 indicates a free or film supply reel from which a strip of film 3 passes to a driving mechanism 4 and then past a projection optical system 5. The film 3 returns to engage the driving mechanism 4 and is finally wound upon a driven reel 6. The indicated path of travel of the film 3 is one of many different arrangements which are conventionally employed and all of which may be used with my invention. The reels employed by my invention may be used for either feeding or receiving the film and may be mounted without modification of the shaft provided on standard projectors for these reels.

The reel 1 consists of an outer, circular disc 10 and an inner, circular disc 11 concentrically joined by a small, tubular hub 12 (Figure 8). The inner and outer discs are spaced apart sufficiently that a strip of film of the size for which the reel is adapted may be received between them without contact from either disc. The outer disc 10 has a circular central aperture 13 (Figure 3) and the inner disc a square central aperture 14 (Figures 4 and 5). The size of the apertures 13 and 14 is such that the reel 1 may be mounted directly upon the spool shaft of any conventional projector. An integral part of the outer disc 10 is the circular, center portion 15. Radially outwardly from the center portion 15 are a plurality of openings 16, each having a curved, radially inward wall 17, which walls, as a group, define the central portion 15. A further opening 18 is provided in the outer disc 10 similar to the openings 16 except that it extends substantially into the center portion 15 and has an arcuate leg portion 19 extending between one of the openings 16 and the center of the outer disc (Figure 3). The opening 18 and its leg portion 19 serve as an access opening for threading the film when the reel 1 is mounted for unwinding.

The inner disc 11 is quite similar to the outer disc 10 except that it has a larger center portion 20 equipped with three equally spaced, circular apertures 21 and an elongated aperture 21a (Figures 4 and 5). The center of each of the apertures 21 and of the aperture 21a is located radially inwardly of the wall 17 of the center portion 15 of the outer disc 10 for reasons which will be explained under "Operation."

The conversion cap 24 is cup-shaped, having an annular end and a circular peripheral flange 25 (Figure 9). The flange 25 is provided with four, equally spaced, notches 26, each of sufficient width to receive one of the spokes or legs 27 separating the openings 16 and 18 of the outer disc 10. The notches 26 are of such depth that the annular end of the cap will almost seat against the outward face of the outer disc and the free end of the flange 25 will almost contact the inner disc 11. The notches 26 each have a slot 28 extending to one side adjacent the annular end of the cap for seating the legs 27 when the cap is rotated with respect to the outer disc 10. The flange 25 has a relief 29 between each of the notches 26 to permit each segment of the flange to expand when the cap is inserted into the reel 1.

The reel 1, when the film 3 is to be removed therefrom, is mounted on the support 40 (Figures 6, 7 and 8). The support 40 includes a circular plate 41, preferably of the same size as the discs 10 and 11. The plate 41 has a pair of inwardly directed, upwardly converging ears 42 for engaging the bracket 43. The ears 42 are centered about a vertical line passing through the center of the plate 41 and spaced a short distance upwardly of the center. An outwardly extending shaft 44 is mounted at the center of the plate 41 for receiving the reel 1. The inward portion of the shaft 44 is non-circular for engaging the aperture 14 and preventing rotation of the reel.

Adjacent the shaft 44, but to the rearward thereof, is an opening 45, the lower end of which is formed into an inwardly directed, upwardly inclined lip 46. The inward inclination of the lip 46 is preferably about 45°. The lip 46 is also upwardly inclined in a rearward direction but at a minor angle. This lip supports a shaft perpendicular thereto on which shaft is mounted the roller 47 for free rotation. The roller 47 extends through the opening 45 with approximately one-half thereof on each side of the plate 41. When the plate 41 is mounted on the projector, the roller 47 is to the side of the shaft 44 away from the optical system 5.

Mounted to the plate 41, below the roller 47 and adjacent the forward periphery of the plate 41, are the aligning rollers 48 (Figures 6, 7 and 11). The aligning rollers 48 are mounted for free rotation on shafts secured to the U-shaped clip 49. The clip 49 is secured to the plate 41 by a pair of ears 50. The axes of the rollers 48 are horizontal and the rollers are aligned with the film track of the projector.

From the outward side of the plate 41 there project four rods 51. The rods 51 are arranged in a circle of lesser diameter than that of the cap 24. Each of three of the rods 51 are aligned with one of the apertures 21 through the inner disc 11. The remaining rod 51 is aligned with one end of the aperture 21a. On each of the rods 51 is mounted, for free rotation, a roller 52 having a length substantially equal to the spacing between the outer disc 10 and the inner disc 11. The rollers 52 have a flange 53 at each end, which flanges are spaced apart by a shank 54 of the proper width to seat the size film for which the reel is designed (Figure 8). The rollers 52 may be made with flanges of different thickness to provide a shank 54 of the correct width for the size film with which the reel is going to be used. Thus, the reel may be adapted to either 8 or 16 millimeter film. These flanges 53 are tangent to a circle having substantially the same diameter as the inner face of the flange 25 of the cap 24. The purpose of this will be explained more fully under "Operation."

The plate 41 is mounted by the bracket 43, which bracket has an upright tab 60 for seating between and engaging the ears 42 (Figure 10). The tab 60 has a pair of parallel, vertical edges 80 for contacting the ears 42 when the support 40 is mounted as shown in Figure 7. The tab 60 also has a pair of parallel, inclined edges 81 for engaging the ears 42 when the bracket is rotated 45°. By using the edges 81, the support may be held vertical, as shown in Figure 7 although the bracket 43 is rotated. A second pair of parallel, inclined edges 82 permit the bracket to be inclined oppositely to that of the edges 81. Thus, the bracket 43 may be rotated 45° in either direction from the position shown in Figure 7 without changing the position of the support 40. This provides clearance for tightening the screw 64 when the bracket is used on projectors having overhanging obstructions above the shaft 63. The ears diverge slightly downwardly whereby the tab 60 will become wedged between them to limit downward movement of the plate 41. The bracket 43 has a U-shaped offset having a pair of aligned holes 61 and 62. The hole 61 in the inward leg of the offset is square and the hole 62 in the outward leg of the offset is round (Figure 10). This adapts the bracket 43 for mounting upon the standard spool shaft 63 of a conventional projector (Figure 8). Inwardly of the offset, the bracket 43 has a threaded hole for receiving a screw 64 (Figure 8) to secure the bracket to the shaft 63.

The various parts of my invention may be made from any suitable material. Preferably the cap 24 and the reel 1 are fabricated of aluminum. The clip 49 and bracket 43 are fabricated from steel to resist bending. The rollers 47, 48 and 52 are preferably made from brass to reduce wear. The rollers 47, 48 and 52 are each so made and mounted that they may rotate freely and will impose a minimum of drag upon the film 3.

*Operation*

To initially wind the film upon my reel, the reel may first be used as the driven reel 6 upon which the film is wound after passing the optical system 5. When my reel is so used, the cap 24 is first secured to the reel. To mount the cap, the notches 26 are aligned with the legs 27 of the outer disc 10 and the cap pushed into the reel until the legs 27 engage the bottom of these notches. The cap 24 is then rotated to seat the legs 27 in the slots 28. As so mounted, the flange 25 provides a hub upon which the film is wound. Upon operation of the projector, the film 3 is coiled within the reel in the same manner as upon any conventional film reel.

When all the film has been wound on the reel, the reel is removed and placed upon the support 40 by seating it upon the shaft 44 with the inner disc 11 against the plate 41. Engagement between the square hole 14 and the square portion of the shaft 44 holds the reel against rotation with respect to the plate 41. The size of the cap 24 is such that it will hold the film 3 radially outwardly of the rollers 52 and permit the coil of film to pass over the rollers 52 without snagging.

The cap 24 is now rotated to disengage the legs 27 and then withdrawn from the reel. The removal of the cap 24 frees the coil of film which will adjust itself vertically to seat upon the top pair of rollers 52. The inner end of the film, that is, the lead end of the film since it has been reversed in the projection process, is grasped through the access opening 18 and threaded rearwardly over the exit roller 47 (Figure 7). The plane of the film is rotated approximately 45° between the last roller 51 and the exit roller 47. The film 3 makes approximately a 180° turn about the exit roller 47 and moves forwardly toward the guide rollers 48. As the film passes from the exit roller 47 to the guide rollers 48 its plane is again rotated 45° in order to compensate for the initial 45° rotation given to the film inside the reel. The rotation of the film between the exit roller and the guide rollers returns the film to its former horizontal plane with the same face up. By mounting the exit roller 47 on approximately a 45° angle of inclination and having it extend a substantially equal distance each side of the inner disc 11 and the plate 41, the film is guided out of the reel without excessive rotation about its central axis. Further, the film is caused to exit from the reel using only a single roller. Only four rollers are used to guide the film from its position in the coil into the normal film track of the projector. This simplification of the film path and guiding equipment greatly reduces the wear imposed on the film as compared with other structures designed to accomplish the same purpose.

The film passes over the forward one of the guide rollers 48, making approximately a 200° bend and thereby reversing its direction. The film then passes over the rearward one of the rollers 48 making approximately a 180° bend. As the film leaves the second of the rollers 48, it is aligned with the film track of the projector and thereafter traces substantially the same path it would have traced had it been withdrawn from a conventional reel requiring rewinding.

The offsetting of the reel 1 outwardly from the projector, by means of the bracket 43, permits the film to be withdrawn from the center of the reel 1 and then aligned with the conventional film track of the projector with a minimum number of directional changes in the film path. Since the film is being withdrawn from the center of the reel 1, it must first be led to side in order to take it out of the reel. This necessitates offsetting the reel from the normal film track of the projector. By my invention, the film is simultaneously led out of the reel 1 and aligned with the projector's film track. This simple arrangement reduces wear and drag on the film as well as simplifying the entire mechanism.

As the film is withdrawn from the coil in the reel 1, the open center of the coil enlarges and the coil drops downwardly so that it rests only upon the upper pair of rollers 52. The radially innermost coil and at times one or two more adjacent coils will be pulled firmly against the rollers 52 by the pull exerted on the film 3 as it is withdrawn. This, however, is normally relieved.

When all the film has been withdrawn from the reel 1, the reel 1 is removed from the support 40 and the cap 24 is again put in place. The empty reel is now ready for use again as a winding reel to take up film as it is projected.

It will be recognized that my reel is so designed that it may be used either for inside unwinding or in the conventional manner. When the film is withdrawn from the outside of the coil, the support 40 is dispensed with and the reel is mounted directly upon the shaft 63. By placing the cap 24 on the reel, the film may be wound upon or unwound from the reel in the conventional manner. If the strip of film is particularly long, the same result may be accomplished by removing the cap and winding the film directly upon the hub 12. The cap is only essential when the film has to be passed over the rollers 52 of the support 40.

While I have shown and described a preferred embodiment of my invention, it will be recognized that numerous modifications of my invention may be made, each without departing from the principle of my invention. Each of these modifications is to be considered as included in the hereinafter appended claims unless these claims by their language expressly state otherwise.

I claim:

1. In a leading mechanism for unwinding a roll of tape from the inside thereof, said mechanism comprising: an apertured vertical support; means holding said support against rotation; a plurality of horizontal rollers mounted on one side of said support for free rotation; said rollers being arranged in a circle concentrically of said support and spaced substantially inwardly of the periphery of said support; a substantial portion of said aperture in said vertical support being radially inward of said rollers; a flange attached to said support at the lower end of said aperture, said flange projecting away from said horizontal rollers and inclined upwardly at a substantial angle to the horizontal in a direction away from the axis of said rollers and at a minor angle in a direction away from the center line of said support; an exit roller mounted on said flange and perpendicular thereto for free rotation; a pair of guide rollers mounted on said support adjacent the periphery thereof and projecting outwardly therefrom in a direction away from said horizontal rollers, said guide rollers being positioned on the opposite side of the vertical center line of said support from said exit roller; a reel having a pair of spaced radially extending walls, said reel mounted concentrically on said support and held against rotation with respect thereto; said reel having a plurality of first openings for receiving said horizontal rollers and a second opening for receiving said exit roller and through which tape may pass from the inside of said roll to said exit roller.

2. In a leading mechanism for unwinding a roll of tape from the inside thereof as described in claim 1 wherein the radially extending wall of said reel remote from said support defines a plurality of elongated openings arranged in a circle and separated by radially extending spokes; a cup-shaped cap; the walls of the sides of said cap defining a plurality of notches, each of said notches aligned with one of said spokes and each elongated adjacent the closed end of said cap for receiving one of said spokes when said cap is rotated with respect to said reel; the diameter of said cap being a circle tangent to the radially outward periphery of said horizontal rollers.

3. In a leading mechanism for unwinding a roll of tape from the inside thereof, said mechanism comprising: a vertical support; means holding said support stationary; means mounting a plurality of tape supporting rollers for free rotation to the outward face of said support; said tape supporting rollers being horizontal and arranged in a circle concentric with said support; a reel mounted to said support against the outward face and concentrically thereof; means holding said reel against rotation; a plurality of openings through the inward face of said reel for receiving said tape supporting rollers; a removable, cup-shaped cap receivable into said reel through the outward face thereof; the diameter of said cap being a circle tangent to the radially outward periphery of said tape supporting rollers; an inclined exit roller mounted upon said support; said exit roller extending partially into said reel within the area defined between said tape supporting rollers; guide rollers mounted on said support and spaced from the vertical center line of said support oppositely from said exit roller.

4. In a leading mechanism for unwinding a roll of tape from the inside thereof and adapted to be mounted on a film projector having a film track and a first shaft for mounting a film delivery reel and a second shaft for mounting a film receiving reel, said mechanism comprising: a vertical support; means for mounting said support to said first shaft outwardly from said projector and said film track, said means holding said support stationary with respect to said projector; means mounting a plurality of film supporting rollers for free rotation to the outward face of said support; said film supporting rollers being horizontal and arranged in a circle concentrically of said support; a reel mounted to said support against the outward face and concentrically thereof; means holding said reel against rotation; a plurality of openings through the inward face of said reel for receiving said film supporting rollers; a removable cup-shaped cap receivable into said reel through the outward face thereof; the diameter of said cap being a circle tangent to the radially outward periphery of said film supporting rollers; an inclined exit roller mounted upon said support; said exit roller extending partially into said reel within the area defined between said film supporting rollers; guide rollers mounted on said support and spaced from the vertical center line of said support oppositely from said exit roller, said guide rollers aligned with said film track of said projector.

JAMES E. ROOKUS.

References Cited in the file of this patent

UNITED STATES PATENTS

| Number | Name | Date |
|---|---|---|
| 1,186,924 | McNeel | June 13, 1916 |
| 1,541,005 | Tervas | June 9, 1925 |
| 1,946,604 | Wittel | Feb. 13, 1934 |
| 2,019,857 | Hoover | Nov. 5, 1935 |
| 2,255,724 | Sunell | Sept. 9, 1941 |